United States Patent
Faisal et al.

(10) Patent No.: US 7,596,610 B2
(45) Date of Patent: Sep. 29, 2009

(54) METHOD AND SYSTEM FOR INSTALLING APPLICATIONS VIA A DISPLAY PAGE

(75) Inventors: Adil Faisal, Snoqualmie, WA (US); Christine M. Graham, Lawrenceville, GA (US); Nikolai Nedikov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 490 days.

(21) Appl. No.: 11/081,806

(22) Filed: Mar. 15, 2005

(65) Prior Publication Data
US 2006/0212548 A1 Sep. 21, 2006

(51) Int. Cl.
G06F 15/16 (2006.01)
(52) U.S. Cl. .................. 709/220; 709/223; 709/203; 709/227; 717/176
(58) Field of Classification Search .......... 709/220; 717/176
See application file for complete search history.

(56) References Cited

U.S. PATENT DOCUMENTS 6,314,565 B1 * 11/2001 Kenner et al. ............... 717/171
6,421,729 B1 * 7/2002 Paltenghe et al. ............ 709/229
6,546,554 B1 * 4/2003 Schmidt et al. .............. 717/176
2004/0015961 A1 * 1/2004 Chefalas et al. ............. 717/178
2006/0168574 A1 * 7/2006 Giannini et al. ............. 717/168

OTHER PUBLICATIONS

Flanagan, D., JavaScript: The Definitive Guide, Nov. 1, 2001, 4h Edition, O'Reilly Chapters 13.11, 14.9, 21.4 and 22.*
Flanagan, D., JavaScript: The Definitive Guide, Nov. 1, 2001,4h Edition, O'Reilly Chapters 13.11, 14.9, 21.4 and 22, pp. 12.*

* cited by examiner

*Primary Examiner*—Jeffrey Pwu
*Assistant Examiner*—Sulaiman Nooristany
(74) *Attorney, Agent, or Firm*—Perkins Coie LLP

(57) ABSTRACT

A method and system for downloading via a browser a target application using a target control is provided. An installation system provides a web page that is downloaded from a web server to a computer system on which the target application is to be installed. The web page includes a setup frame, a test frame, and an execution frame. The test frame determines whether the target application is installed at the computer system and, if not, effects the invocation of a download/installation component to download and install the target application and an associated target control. The test frame is periodically reloaded and checks to see if the target control is installed. If the target control is installed, then the test frame notifies the execution frame. The execution frame then invokes the target control to effect the launching of the target application.

11 Claims, 18 Drawing Sheets

METHOD AND SYSTEM FOR INSTALLING APPLICATIONS VIA A DISPLAY PAGE

TECHNICAL FIELD

The described technology relates generally to downloading, installing, upgrading and launching computer programs on a computer system.

BACKGROUND

Many web-based services include client-side components that need to be downloaded and installed on the computer systems that are to access the web-based services. Although browsers, such as Microsoft's Internet Explorer, can execute web pages that provide sophisticated user interfaces to web-based services, some web-based services, such as conferencing services, choose to provide their user interface through client-side components. Unless a client-side component is preinstalled on a computer system, it needs to be downloaded when a user seeks to use a web-based service. To increase the chances of a more positive user experience, it would be desirable if client-side components could be downloaded, installed, and launched with minimal user interaction.

Browsers support the execution of controls to extend the browser capability beyond displaying web pages. Internet Explorer uses ActiveX controls, and Mozilla browsers use plug-ins to achieve the same effect as controls. A browser can run preinstalled controls or can download and then run controls. Because programmers can develop malicious controls, a browser typically warns a user before a control is downloaded and seeks the user's permission to download the control. If the user is concerned about security, then the user can refuse permission to download the control. The process of warning the user when a control is about to be downloaded, however, means that the user needs to be involved when a control is downloaded.

Typically, when a client-side component is to be downloaded, a web page prompts a user to select a link. When the link is selected, then the web page invokes a download/installation component to download and install the client-side component. The download/installation component prompts the user to make various decisions to complete the download and installation. After the installation is complete, the user can then leave the browser and run the executable for the client-side component.

Although a user may find it less than convenient to install the new client-side component, the user may be willing to do so to gain access to the web-based service. Providers of web-based services, however, may want to update their client-side components frequently so that users have the most current technology. Unfortunately, the process of installing a new version of a client-side component can be even more cumbersome than the installation of the original version of the client-side component.

It would be desirable to have a technique for downloading installable components via a browser in a way that minimizes user interactions needed to download, install, and run the installable components without compromising user security.

SUMMARY

A method and system for downloading via a browser a target application using a target control is provided. An installation system provides a web page that is downloaded from a web server to a computer system on which the target application is to be installed. The web page includes a setup frame, a test frame, and an execution frame. The test frame determines whether the target application is installed at the computer system and, if not, effects the invocation of a download/installation component to download and install the target application and an associated target control. The test frame is periodically reloaded and checks to see if the target control is installed. If the target control is installed, then the test frame notifies the execution frame. The execution frame then invokes the target control to effect the launching of the target application.

DETAILED DESCRIPTION

Figure 1:
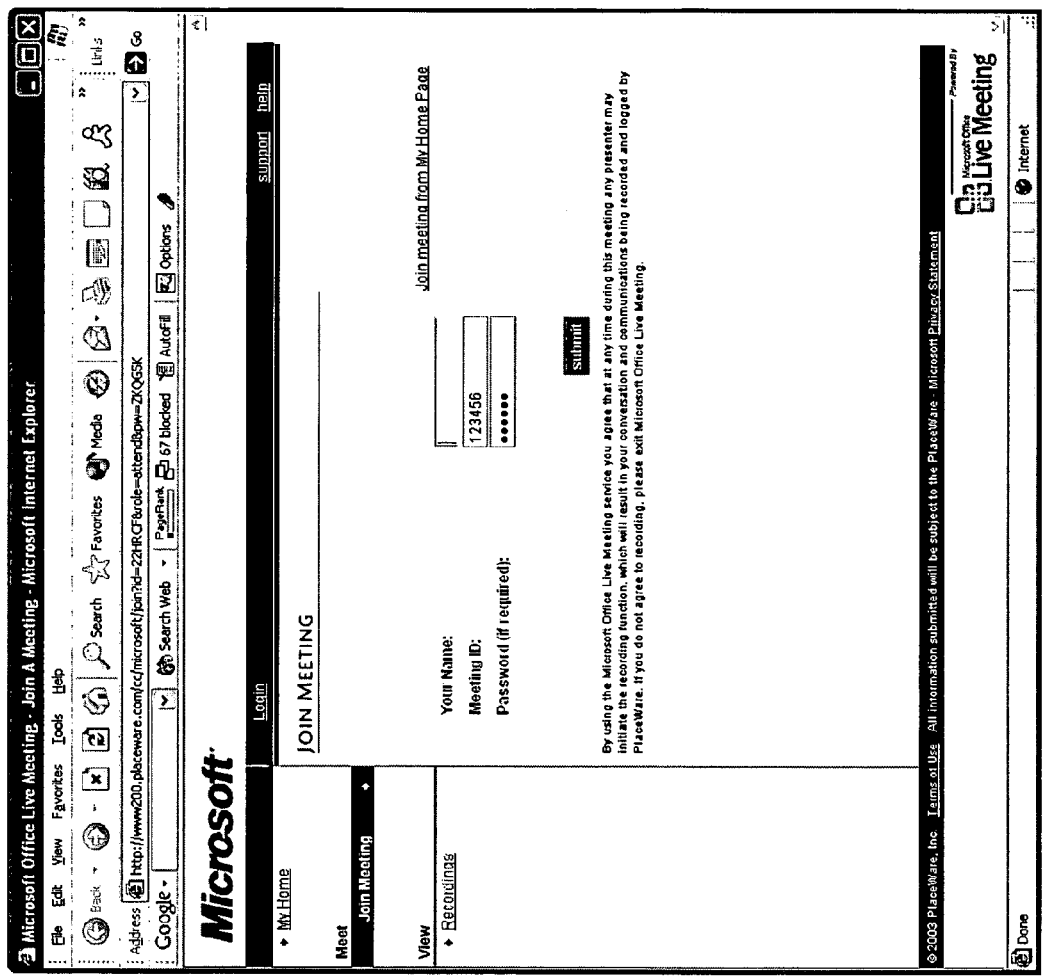
FIG. 1 is a web page that is presented when a user selects to join a meeting.

A method and system for downloading via a browser a target application using a target control is provided. In one embodiment, an installation system provides a web page (i.e., a display page) that is downloaded from a web server to a computer system on which the target application is to be installed. The web page includes a setup frame, a test frame, and an execution frame. The test frame determines whether the target application is installed at the computer system. If the target application is not installed, a download/installation component is invoked by the setup frame to control the download and installation of the target application. The download/installation component prompts the user at various points to control the download process. A target installer that is downloaded contains the target application and the target control. Installation of the target control indicates that installation of the target application has been completed. The target control provides an interface through which the target application can be launched. The test frame is periodically reloaded and checks to see if the target control is installed. If the target control is installed, then the test frame notifies the execution frame. The execution frame then invokes the target control to effect the launching of the target application. If the target application was already installed, then the test frame would immediately detect that the target application is installed and notify the execution frame so that the target application can be launched. Because the installation system automatically detects that a target application has been installed and launches the target application via the target control, the user does not need to take any action once the target application is installed.

In one embodiment, the test frame can use the registration of the target control as an indication of the completion of the downloading and installation of the target application. Whenever the test frame is periodically loaded, it can try to load the target control. If successful in loading the target control, the test frame notifies the execution frame so that it can request the target control to launch the target application. Alternatively, the installation of the target application can also store various cookies associated with the target application. The test frame can use the presence of a cookie as an indication of completion of the downloading and installation of the target application. In certain cases, the web page may be received from a domain that is different from the domain from which the target application is downloaded. Browsers typically prevent web pages of one domain from accessing the cookies of another domain. To allow the test frame to detect the presence of a cookie, the installation of the target application stores cookies for various domains from which an installation web page can be downloaded. For example, if an installation web page can be downloaded from a "Microsoft.com" or a "LiveMeeting.com" domain, then the installation of the target application registers a cookie for both domains. In this way, regardless of from which domain the installation web page is downloaded, the test frame will detect completion of the download and installation of the target application.

In one embodiment, the execution frame determines whether a newer version or some other version of the target application is available to be downloaded and installed. The web server that provided the web page may have encoded version information in the web page. The execution frame may invoke the target control to determine the version of the installed target application. If the versions indicate that a new version should be downloaded and installed, then the execution frame initiates the download and installation. Since the target control itself is reinstalled as part of the upgrade process, the download and installation will not be successful when the web page has the old version of the target control loaded. Therefore, the execution frame will effect the overwriting of the web page with a blank web page resulting in the unloading of the target control. In addition, any access to the target control during the upgrade process will result in failure of the upgrade. As a result, the installation system uses the cookie polling technique to detect completion of the download and installation of the new version of the target application.

In one embodiment, a browser may not support controls. In such a case, the installation system provides a web page that does not rely on a target control to launch the target application. When the web page is displayed to the user, it prompts the user to select a link to initiate the download and installation of the target application. When the user selects the link, the web page runs the download/installation component to download and install the target application. To effect the launching of the target application after installation, the installation system provides an association between a target MIME-type (e.g., a file extension) and the target application. The web page may store target information (e.g., authentication information provided when the web page was downloaded) to be used by the target application in a file of the target file type. The browser then requests that the target file be loaded. Because the target file's MIME-type is associated with the target application, the loading of the target file by the browser results in the target application being launched by the browser with the target information of the target file being accessible to the target application. In this way, the target application can be launched from the browser without the use of a target control.

Figure 2:
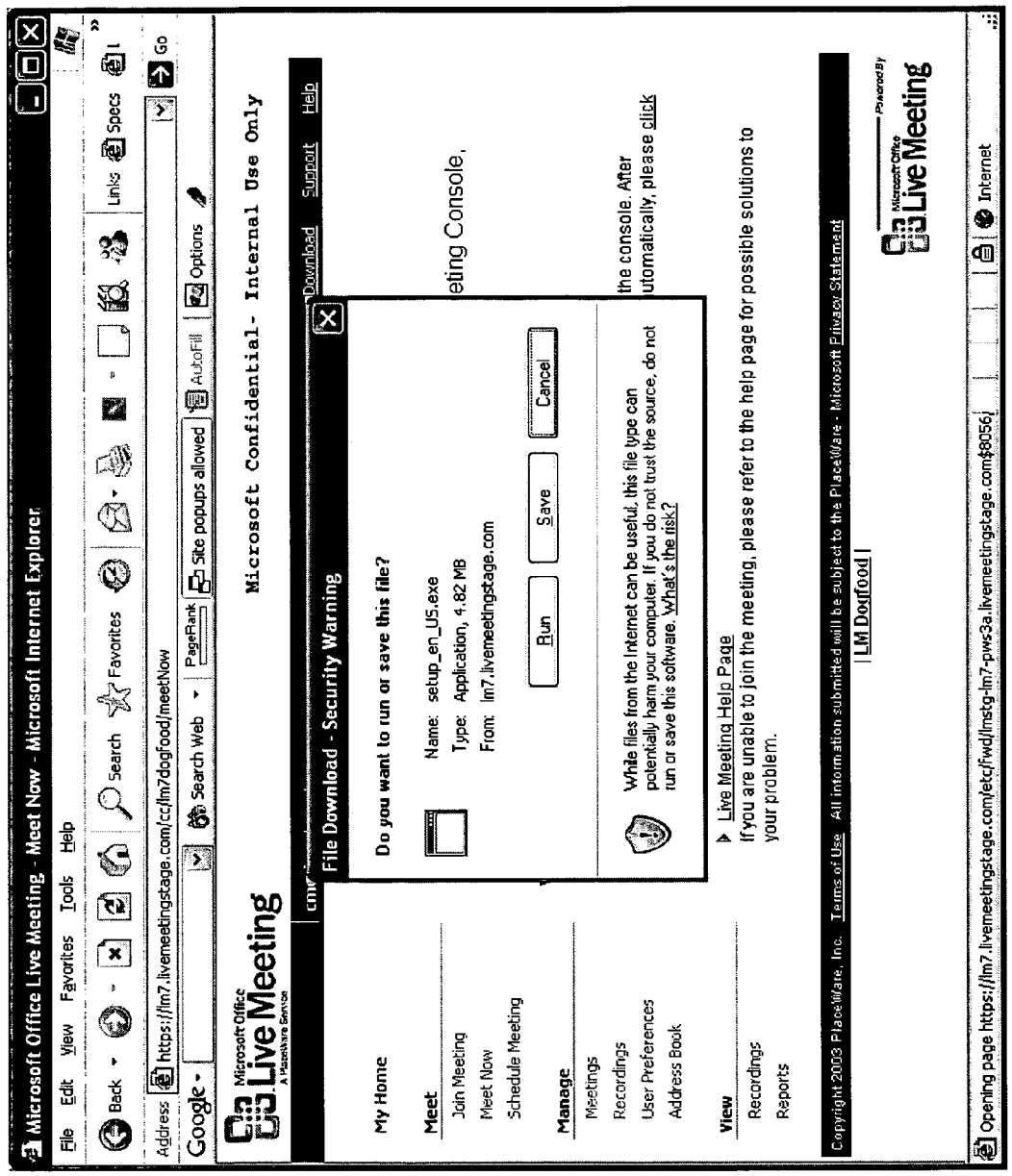
FIG. 2 is a web page that illustrates the first dialog box of the component that downloads and installs the target application.
Figure 3:
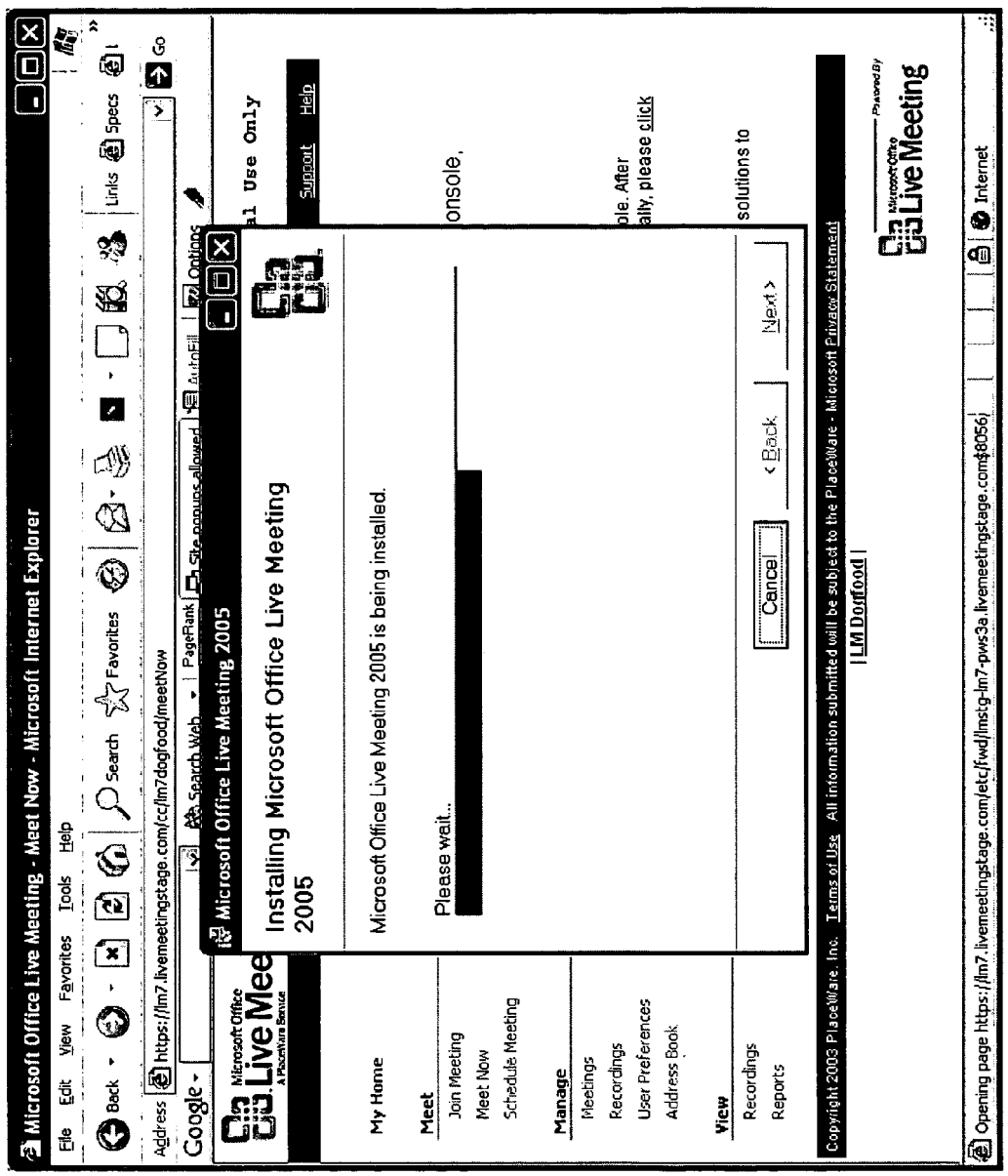
FIG. 3 is a web page that illustrates the second dialog box of the download/installation component.
Figure 4:
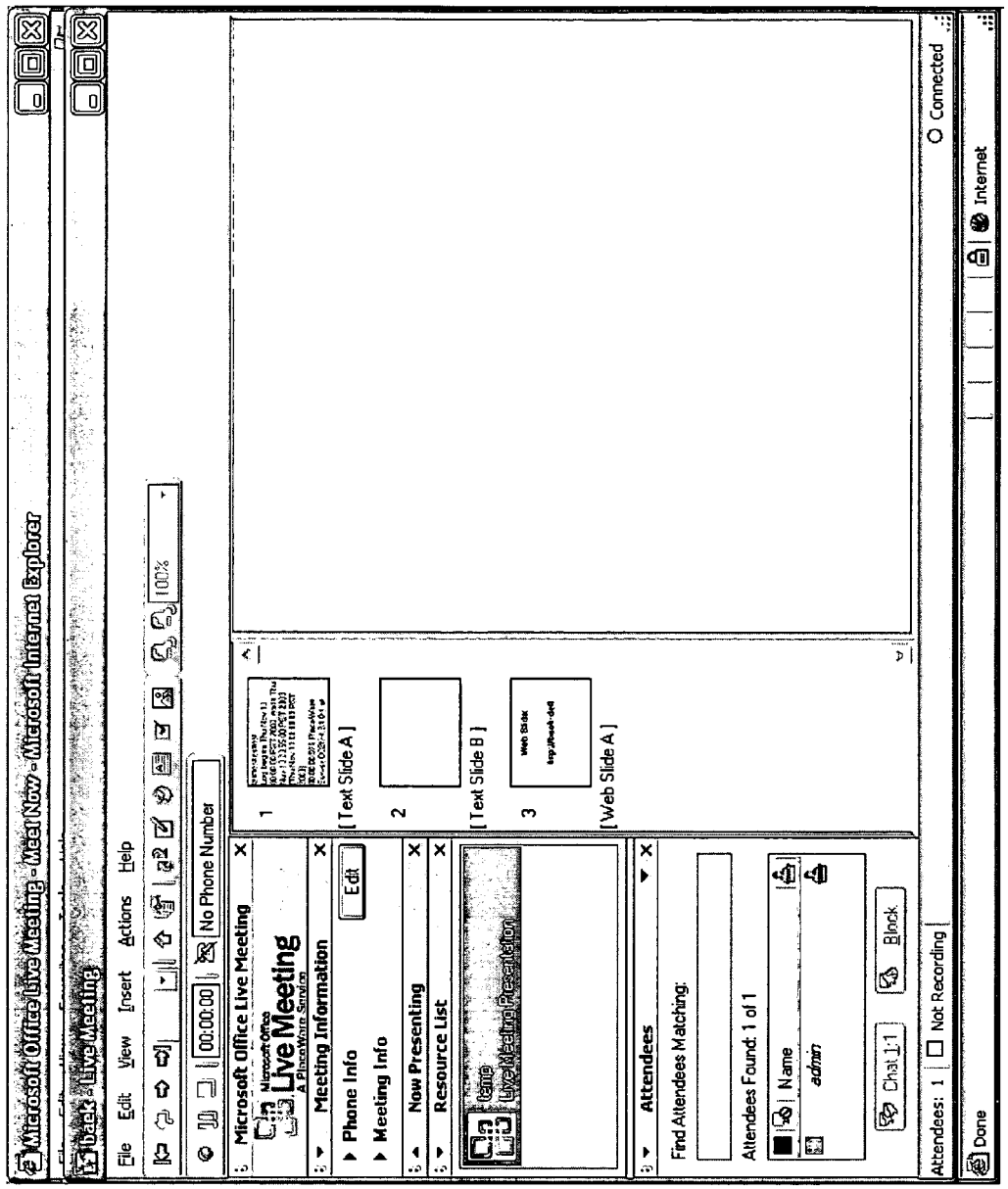
FIG. 4 is a display of the downloaded, installed, and launched target application.
Figure 14:
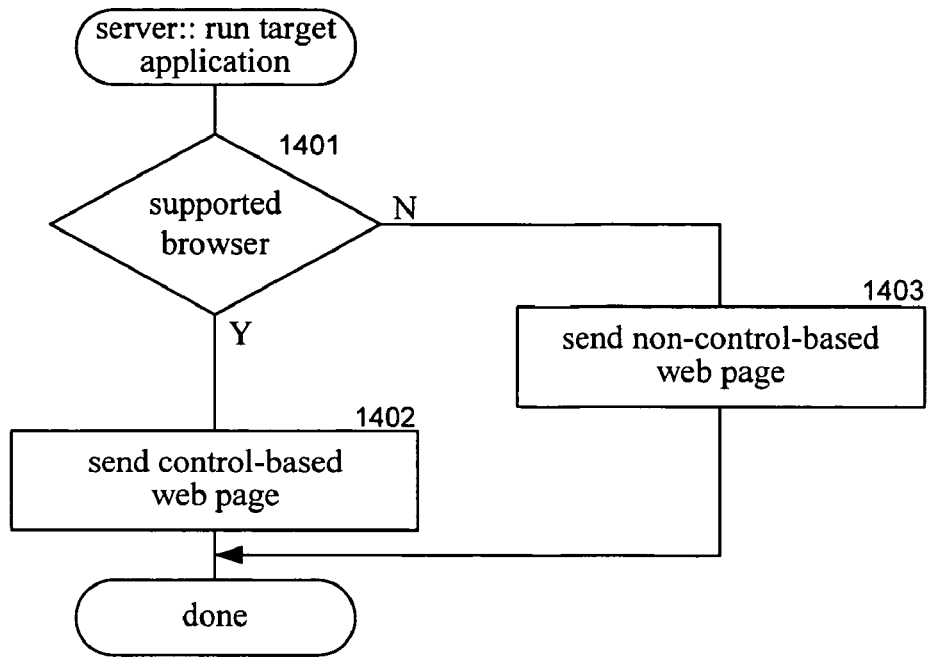
FIG. 14 is a flow diagram that illustrates the processing of a component of the installation system of the server computer system that selects the appropriate web page in one embodiment.

FIGS. 14 are web pages that illustrate the downloading, installing, and launching of a target application when the browser supports controls in one embodiment. In this example, the target application is the client-side component of MICROSOFT's LIVE MEETING web application. FIG. 1 is a web page that is presented when a user selects to join a meeting. The web page is displayed after the user selects a link, for example, from an electronic mail message notification of the meeting. The user is prompted to enter a password and then to select the submit button. When the user selects the submit button, a request message is sent to the server computer system that executes the server-side component of the web application. FIG. 2 is a web page that illustrates the first dialog box of the component that downloads and installs the target application. The web page is provided by the server computer system and includes a setup frame, a test frame, and an execution frame. The test frame detects that the target application was not installed and notifies the setup frame. The setup frame upon receiving a notification launches the download/installation component to download and install the target application. The dialog box is the first dialog box of the download/installation component. FIG. 3 is a web page that illustrates the second dialog box of the download/installation component. This dialog box is displayed after the user selects the run button of the first dialog box. FIG. 4 is a display of the downloaded, installed, and launched target application. The web page is displayed after the user selects the close button of the fourth dialog box. As can be seen by FIGS. 14, the user makes three selections in order to download, install, and launch the target application when the browser supports controls.

Figure 5:
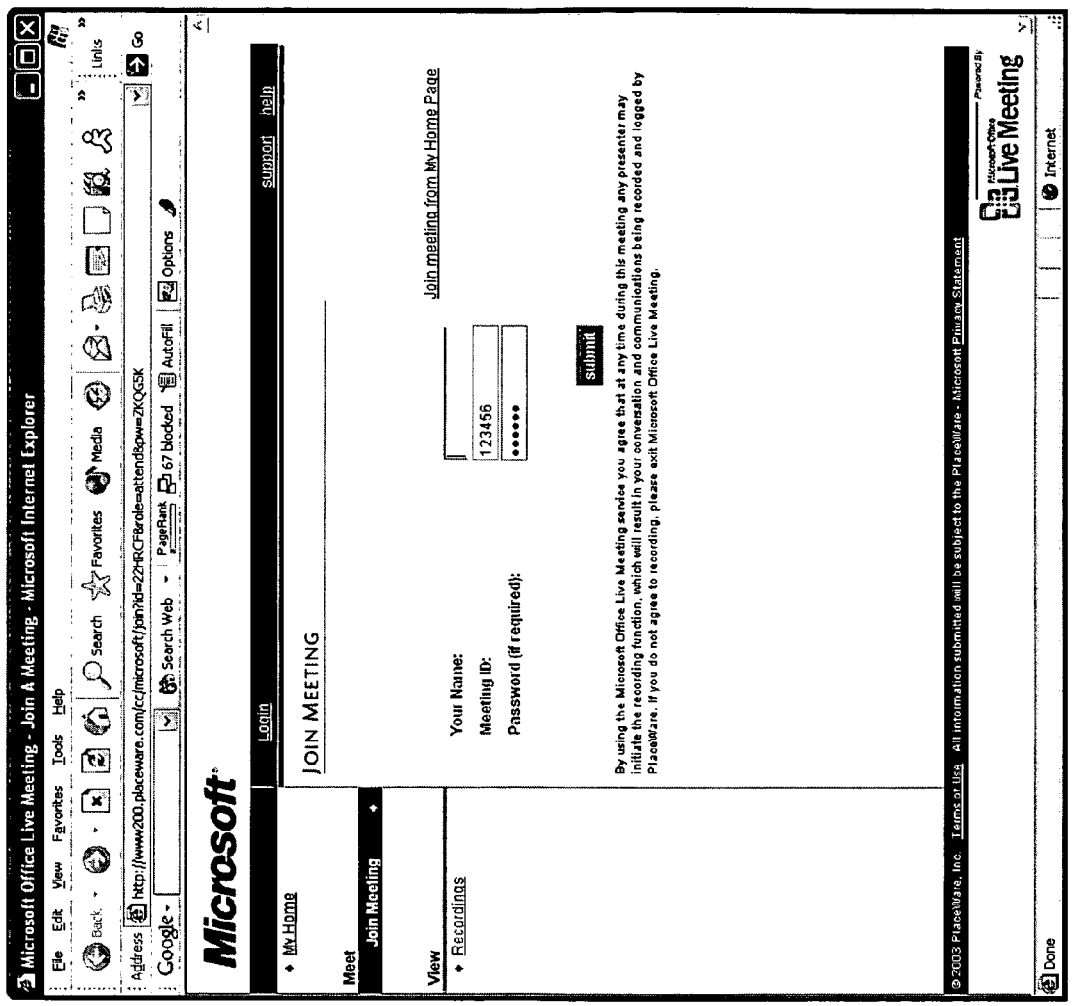
FIG. 5 is a web page that is presented when a user selects to join a meeting.
Figure 6:
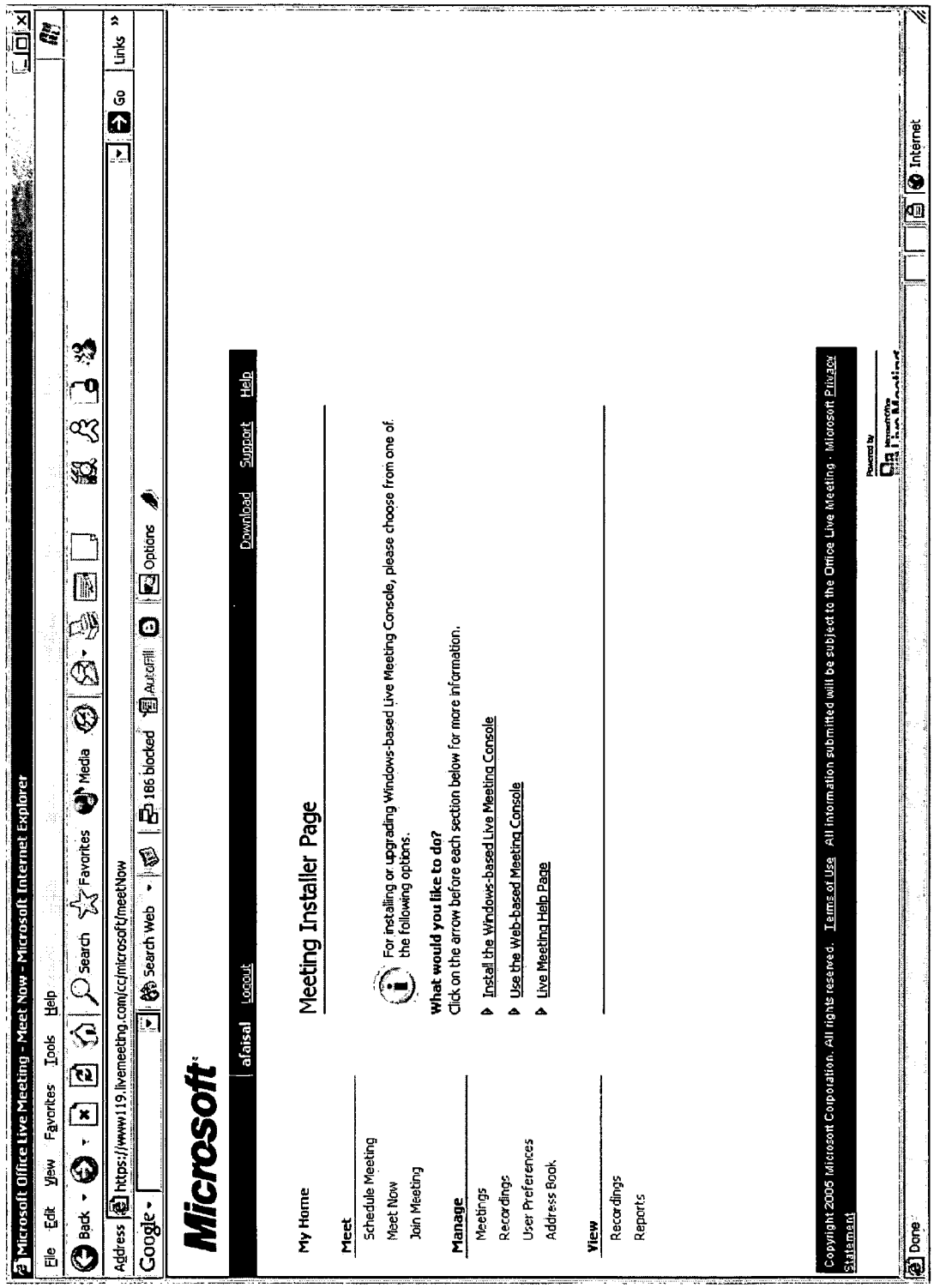
FIG. 6 is a web page that illustrates prompting a user to select an install link to download and install the target application.
Figure 7:
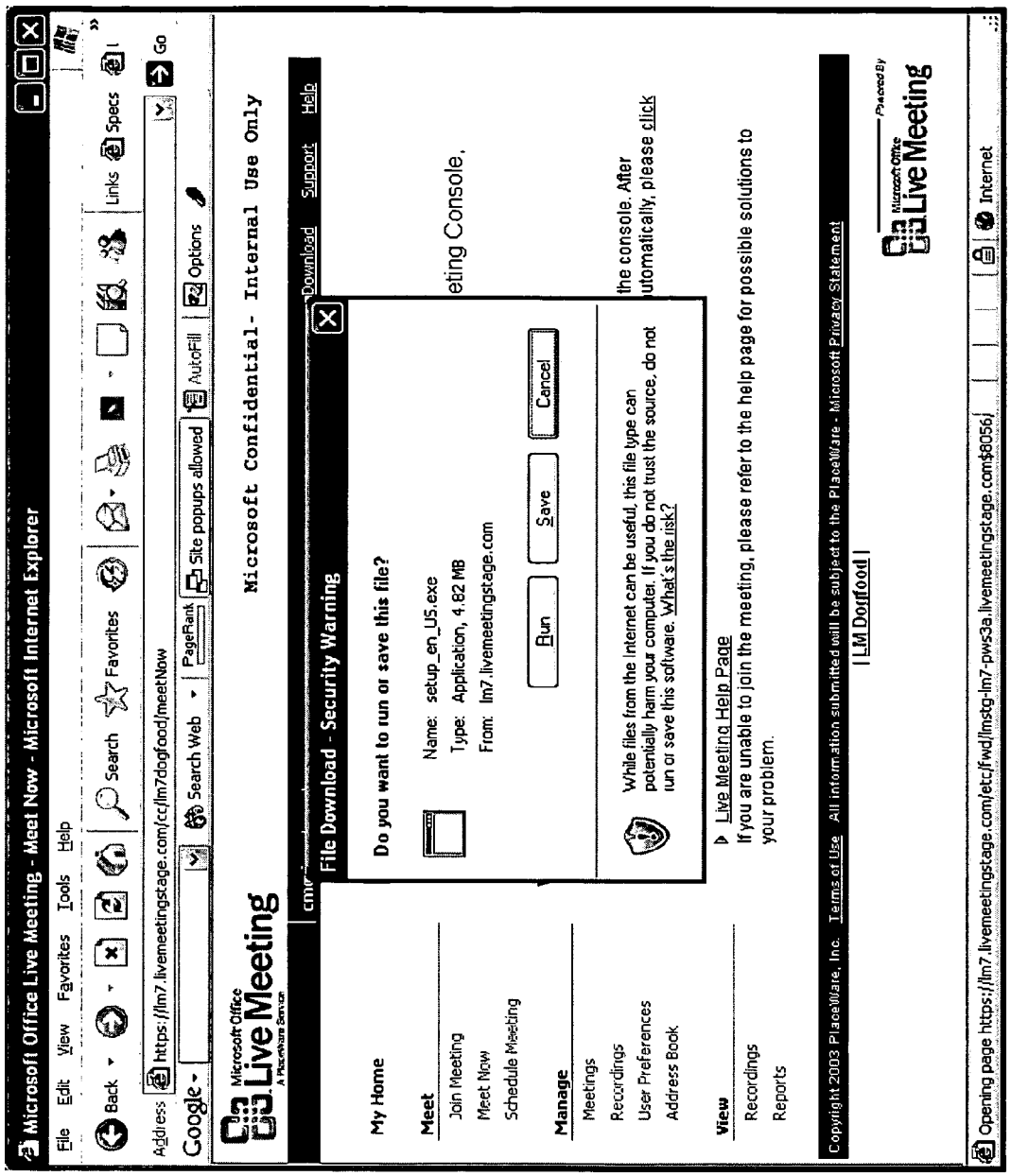
FIGS. 7-10 control the downloading and installation of the target application.
Figure 8:
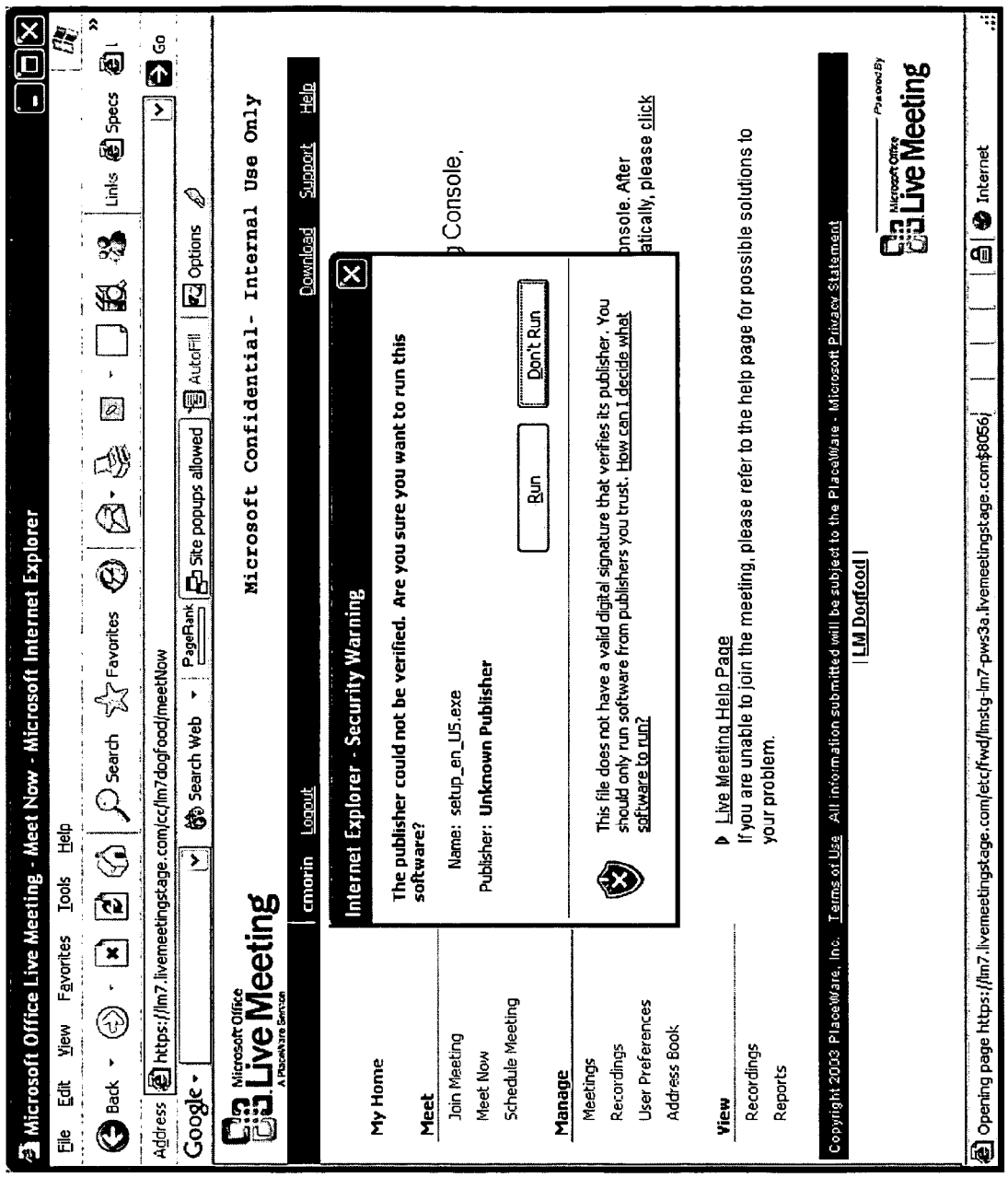
Figure 9:
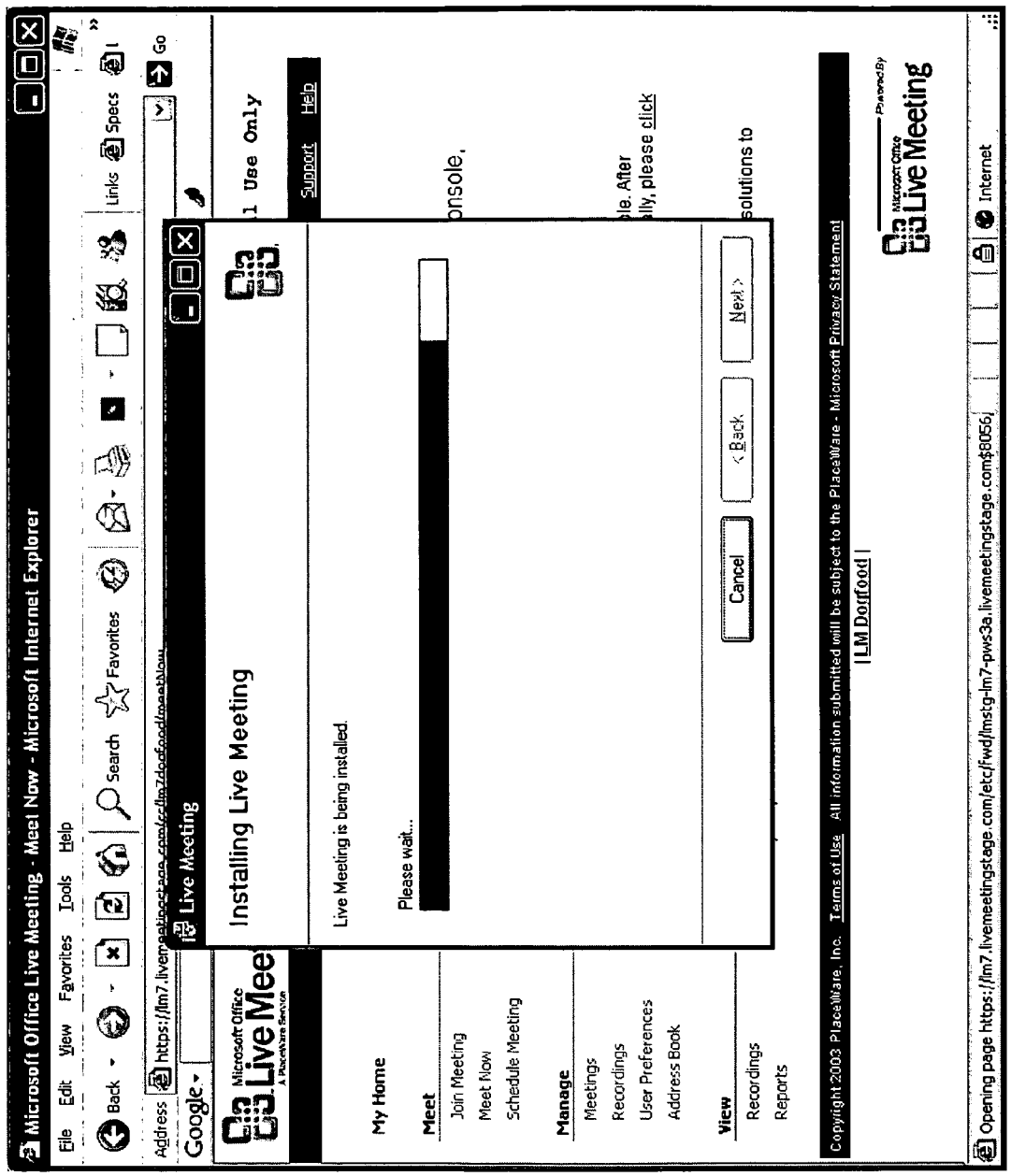
Figure 10:
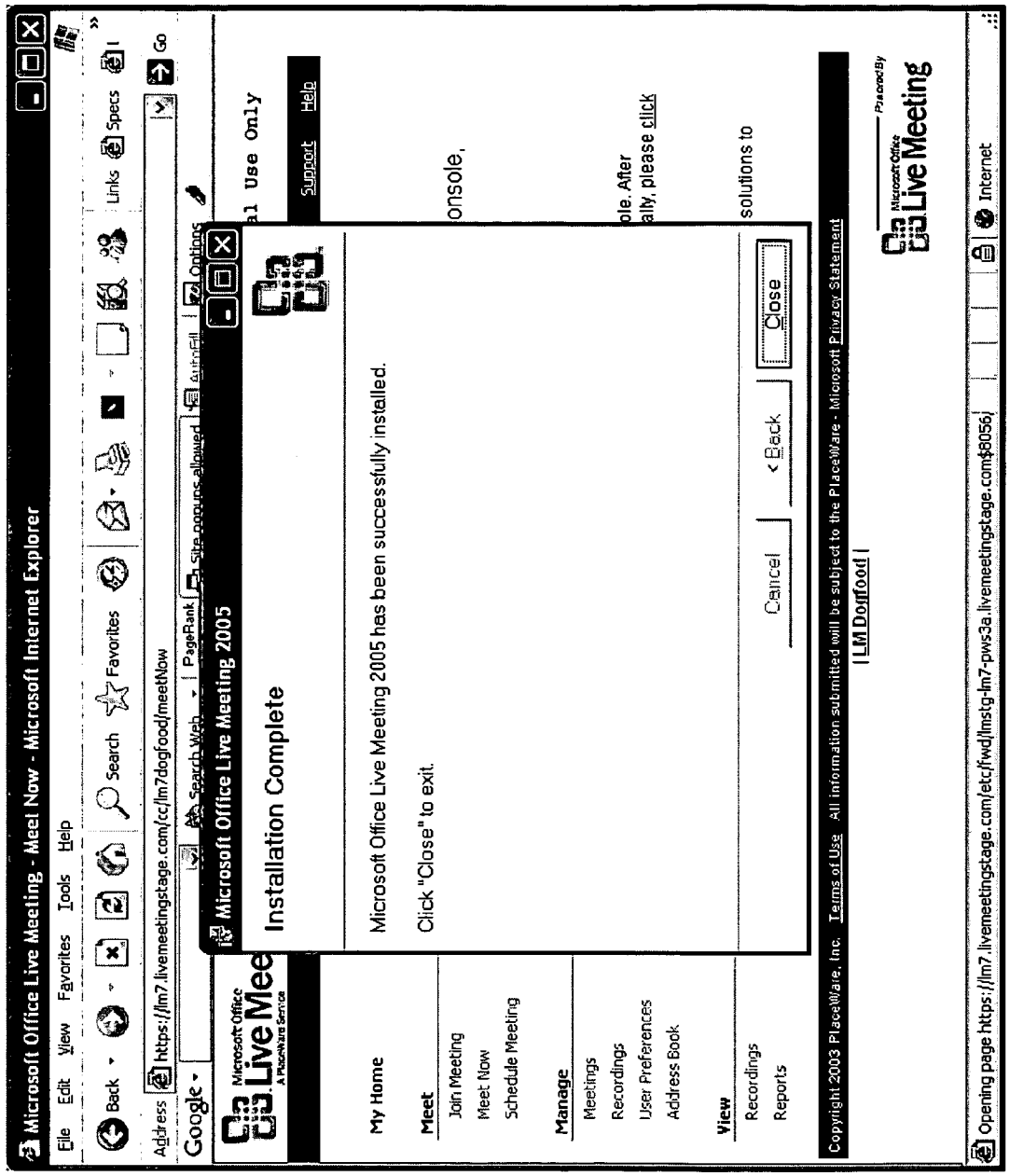
Figure 11:
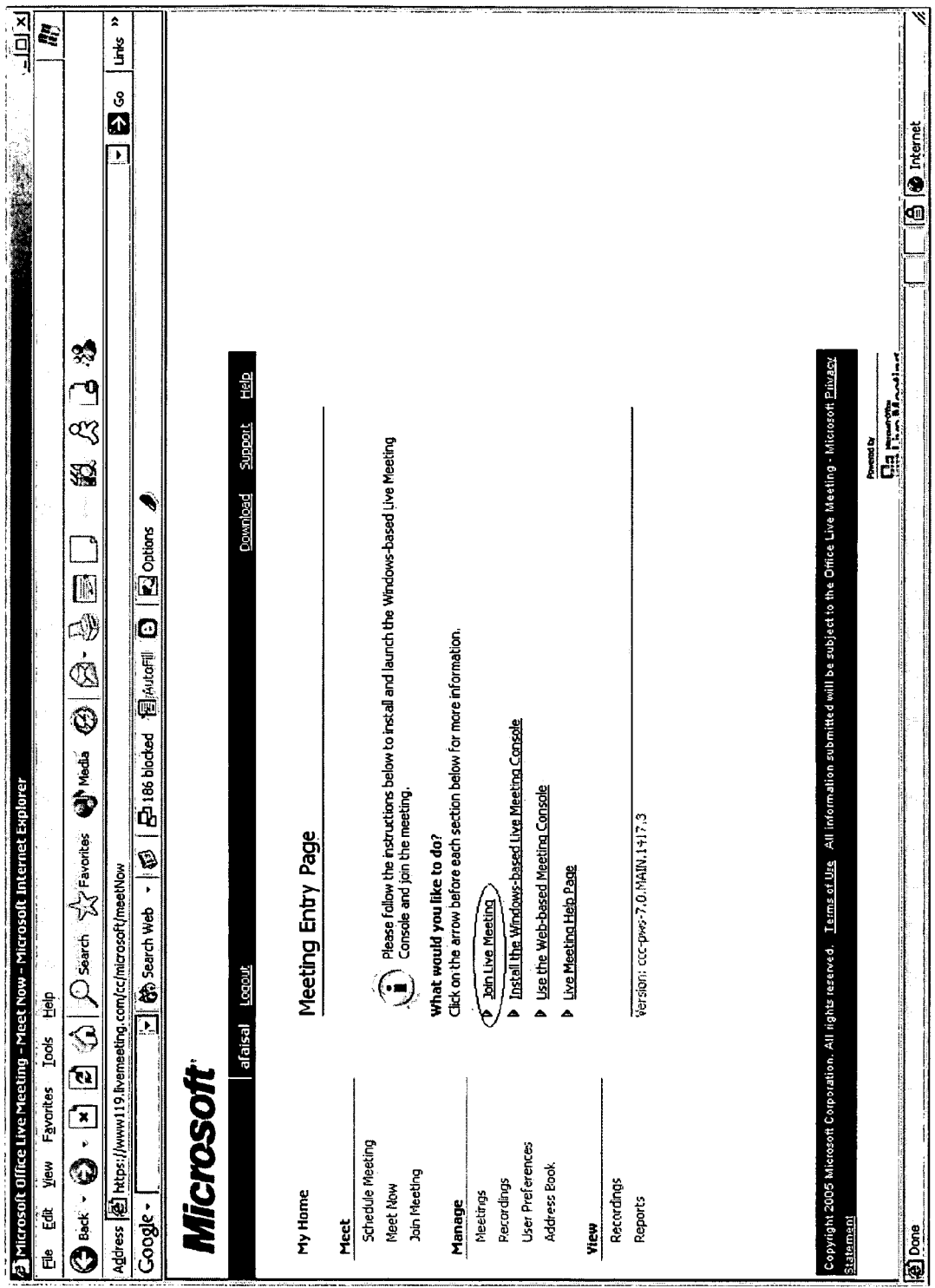
FIG. 11 is a web page that illustrates the prompting of the user to select a launch link to launch the target application.

FIGS. 5-12 are web pages that illustrate the downloading, installing, and launching of the target application when the browser does not support controls in one embodiment. FIG. 5 is a web page that is presented when a user selects to join a meeting. The web page is displayed after the user selects a link, for example, from an electronic mail message notification of the meeting. The user is prompted to enter a password and then select the submit button. FIG. 6 is a web page that illustrates prompting a user to select an install link to download and install the target application. This web page is downloaded from the server. When the user selects the install link, the web page launches the download/installation component. FIGS. 7-10 control the downloading of an installation of the target application when the browser does not support controls. FIG. 11 is a web page that illustrates the prompting of the user to select a launch link to launch the target application.

Figure 12:
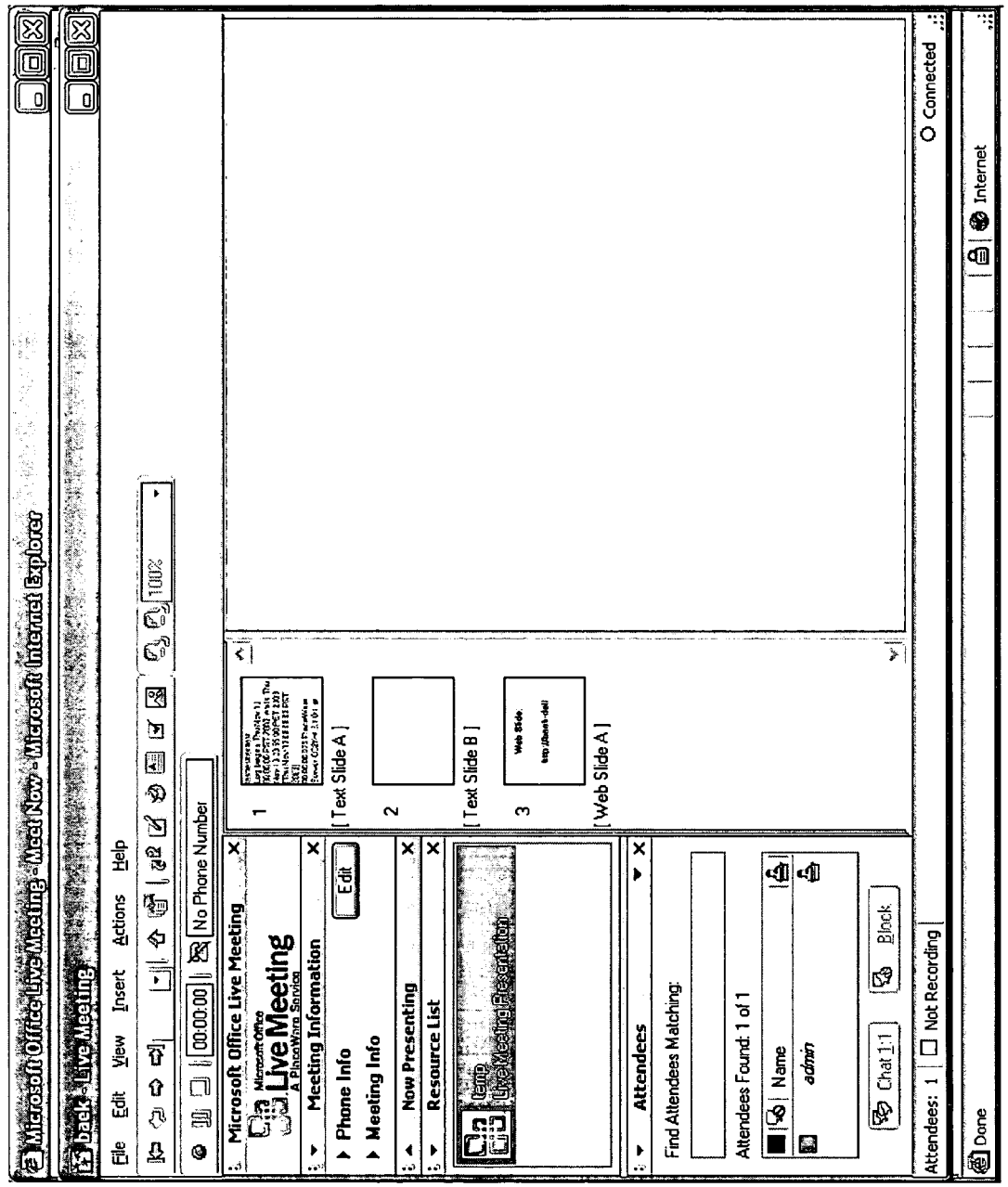
FIG. 12 is a web page of the downloaded, installed, and launched target application.

FIG. 12 is a display of the downloaded, installed, and launched target application. The target application is launched after the user selects the launch link of the web page of FIG. 11. As can be seen by FIGS. 5-12, the user makes five selections to download, install, and launch the target application when the browser does not support controls.

Figure 13:
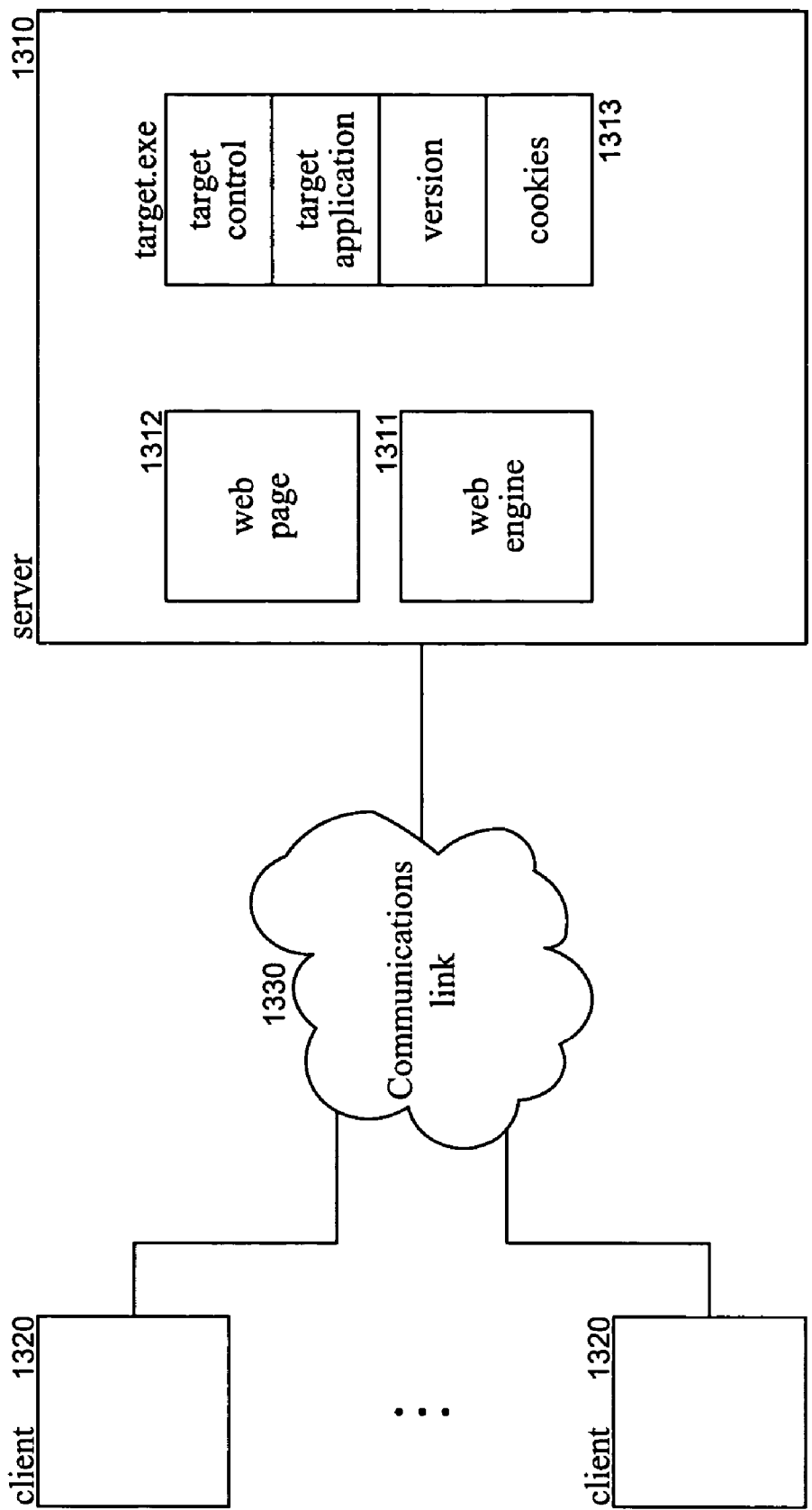
FIG. 13 is a block diagram that illustrates components of the installation system in one embodiment.

FIG. 13 is a block diagram that illustrates components of the installation system in one embodiment. The installation system 1310 is implemented on a server computer system that communicates with client computer systems 1320 via communications link 1330. The installation system includes a web engine 1311, web pages 1312, and a target installer file 1313. The server computer system may provide the services of a web application, such as a conferencing system. When a user at a client computer system selects to run the target application, a request message (e.g., HTTP request) is sent to the web engine. The request includes an indication of whether the browser of the client computer system supports controls. The web engine selects the appropriate web page based on whether the browser supports controls. The web engine sends that web page in a responsive message (e.g., HTTP response) to the client computer system. The web page may include version information of a version of the target application that is appropriate for the client computer system and may include authentication information of the user to be used when launching the target application. When the browser of the client computer system executes the web page, the target installer is downloaded to the client computer system. The target installer includes a target control, target application, version information, cookies, and MIME-type information.

The computing device on which the installation system is implemented may include a central processing unit, memory, input devices (e.g., keyboard and pointing devices), output devices (e.g., display devices), and storage devices (e.g., disk drives). The memory and storage devices are computer-readable media that may contain instructions that implement the installation system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the installation system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The installation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

FIG. 14 is a flow diagram that illustrates the processing of a component of the installation system of the server computer system that selects the appropriate web page in one embodiment. The component is invoked when the server computer system receives a request message indicating that the user wants to execute the target application. In decision block 1401, if the request message indicates that the browser of the client computer system supports controls, then the component continues at block 1402, else the component continues at block 1403. In block 1402, the component sends the control-based web page to the client computer system and then completes. In block 1403, the component sends the no-control-based web page to the client computer system and then completes.

Figure 15:
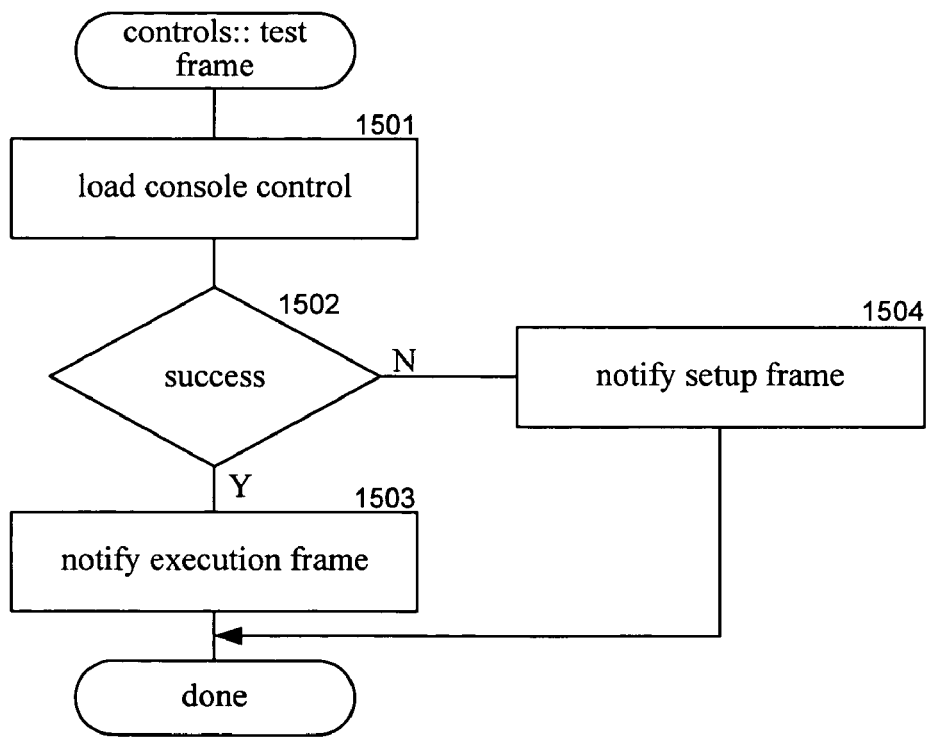
FIG. 15 is a flow diagram that illustrates the processing of the test frame of the controls-based web page in one embodiment.

FIGS. 15-19 are flow diagrams that illustrate the processing of the frames of a control-based web page in one embodiment. FIG. 15 is a flow diagram that illustrates the processing of the test frame of the control-based web page in one embodiment. The test frame determines whether the target control can be loaded. If so, it notifies the execution frame so that the target application can be launched, else it notifies the setup frame to start the download and installation process. In block 1501, the frame attempts to load the target control. In decision block 1502, if the target control is successfully loaded, then the frame continues at block 1503, else the frame continues at block 1504. In block 1503, the frame notifies the execution frame and completes. In block 1504, the frame notifies the setup frame and completes.

Figure 16:
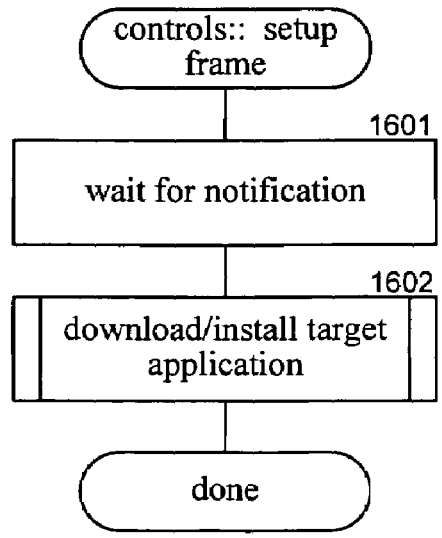
FIG. 16 is a flow diagram that illustrates the processing of the setup frame of the controls-based web page in one embodiment.

FIG. 16 is a flow diagram that illustrates the processing of the setup frame of the control-based web page in one embodiment. The setup frame initiates the download and installation process of the target application. In block 1601, the frame waits to receive a notification from the test frame that the target application is not installed. In block 1602, the frame launches the download/installation component to download and install the target application. The frame then completes.

Figure 17:
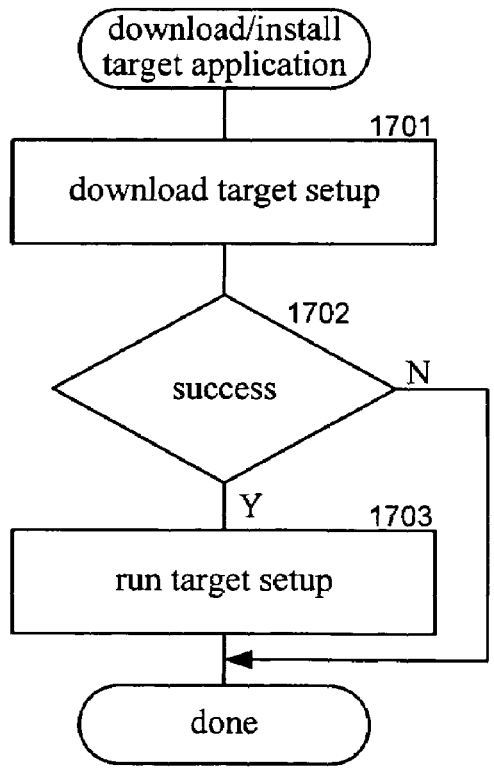
FIG. 17 is a flow diagram that illustrates the processing of the download/installation component in one embodiment.

FIG. 17 is a flow diagram that illustrates the processing of the download/installation component in one embodiment. The component is passed an indication of the target application to download and install. In block 1701, the component downloads the target installer from the server computer system. In decision block 1702, if the target installer is successfully downloaded, the component continues at block 1703, else the component returns. In block 1703, the component runs the target installer and then completes.

Figure 18:
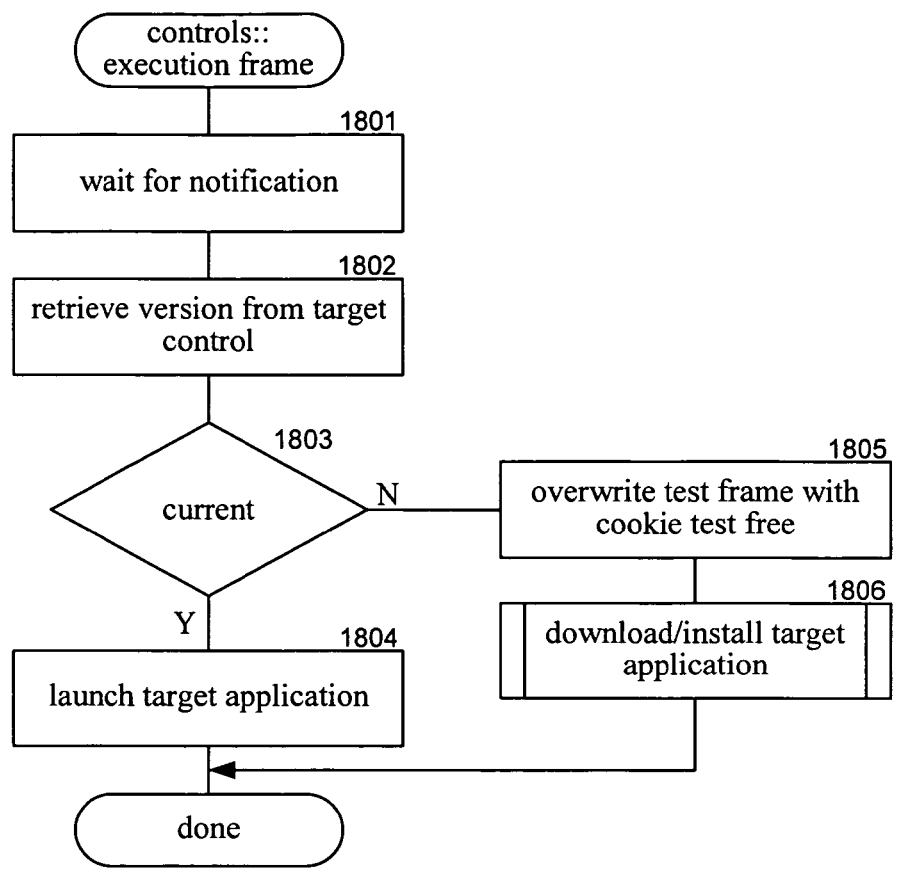
FIG. 18 is a flow diagram that illustrates the processing of the execution frame of the control-based web page in one embodiment.

FIG. 18 is a flow diagram that illustrates the processing of the execution frame of the control-based web page in one embodiment. The frame determines whether the installed application is an appropriate version and, if not, downloads and installs an appropriate version. The frame then launches the target application. In block 1801, the frame waits for notification from the test frame that the target application has been installed. In block 1802, the frame invokes the target control to retrieve the version information for the installed target application. In decision block 1803, if the version information of the web page and the version information of the installed target application indicate that the new version is needed, then the frame continues at block 1805, else the frame continues at block 1804. In block 1804, the frame launches the target application by invoking the target control. The frame then completes. In block 1805, the component overwrites the test frame with a test frame that implements a cookie-based technique for determining whether the target application has been installed. In block 1806, the frame launches the download/installation component to download and install the target application. The frame then completes.

Figure 19:
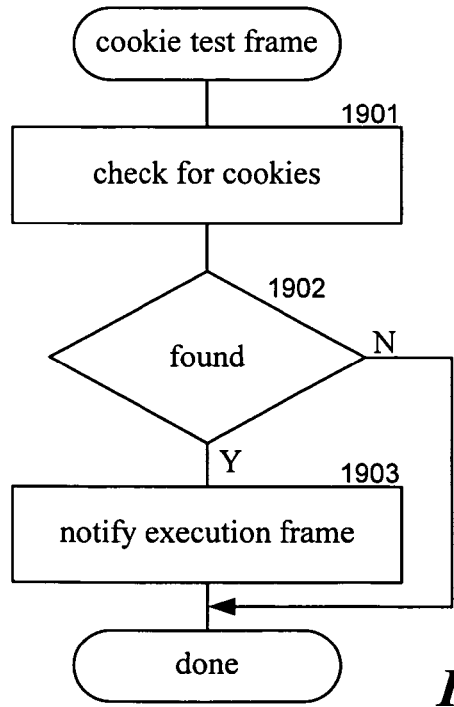
FIG. 19 is a flow diagram that illustrates the processing of the cookie test frame in one embodiment.

FIG. 19 is a flow diagram that illustrates the processing of the cookie test frame in one embodiment. In block 1901, the frame checks for cookies associated with the domain from which the web page was downloaded. In decision block 1902, if the cookies are found, then the frame continues at block 1903, else the frame completes until it is reloaded again. In block 1903, the component notifies the execution frame that the target application has been downloaded and installed.

Figure 20:
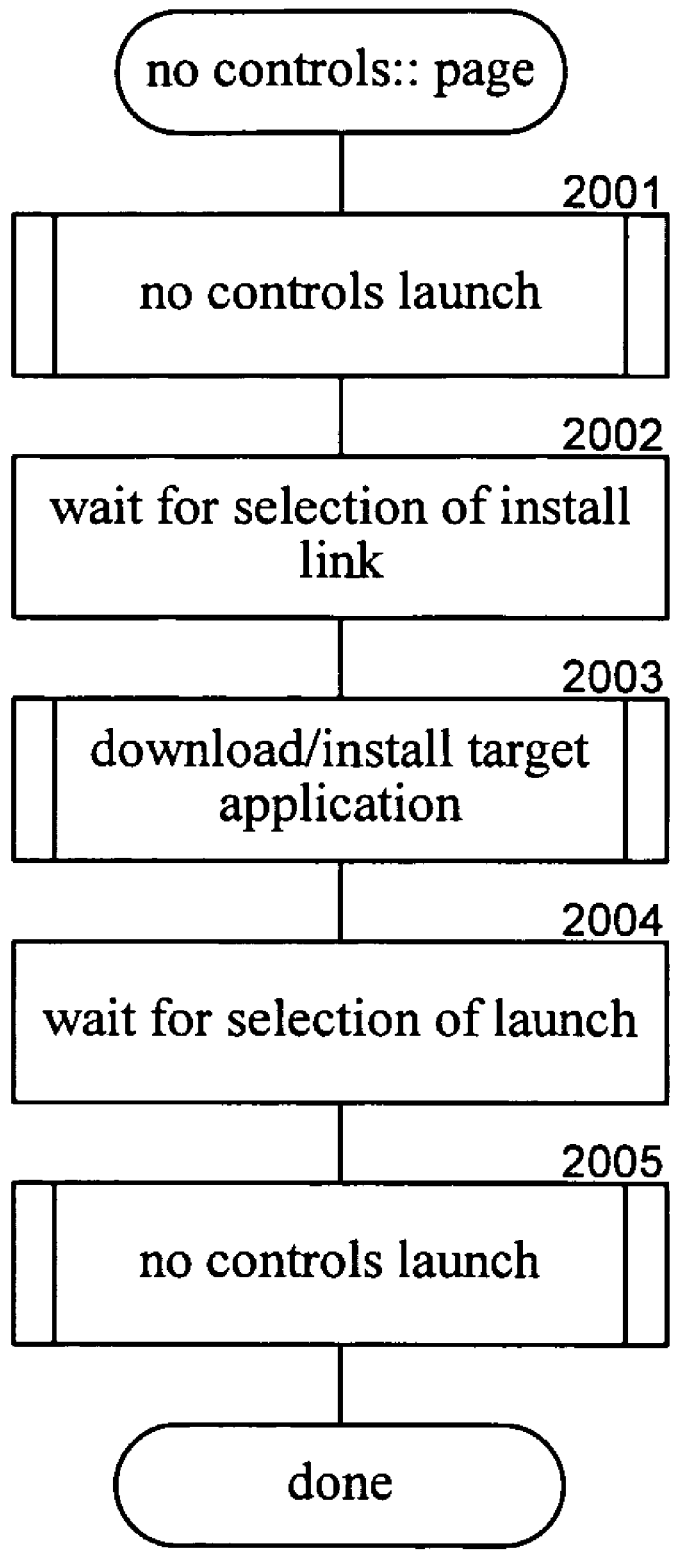
FIGS. 20-21 illustrates the processing of the frames of a no-control-based web page in one embodiment.
Figure 21:
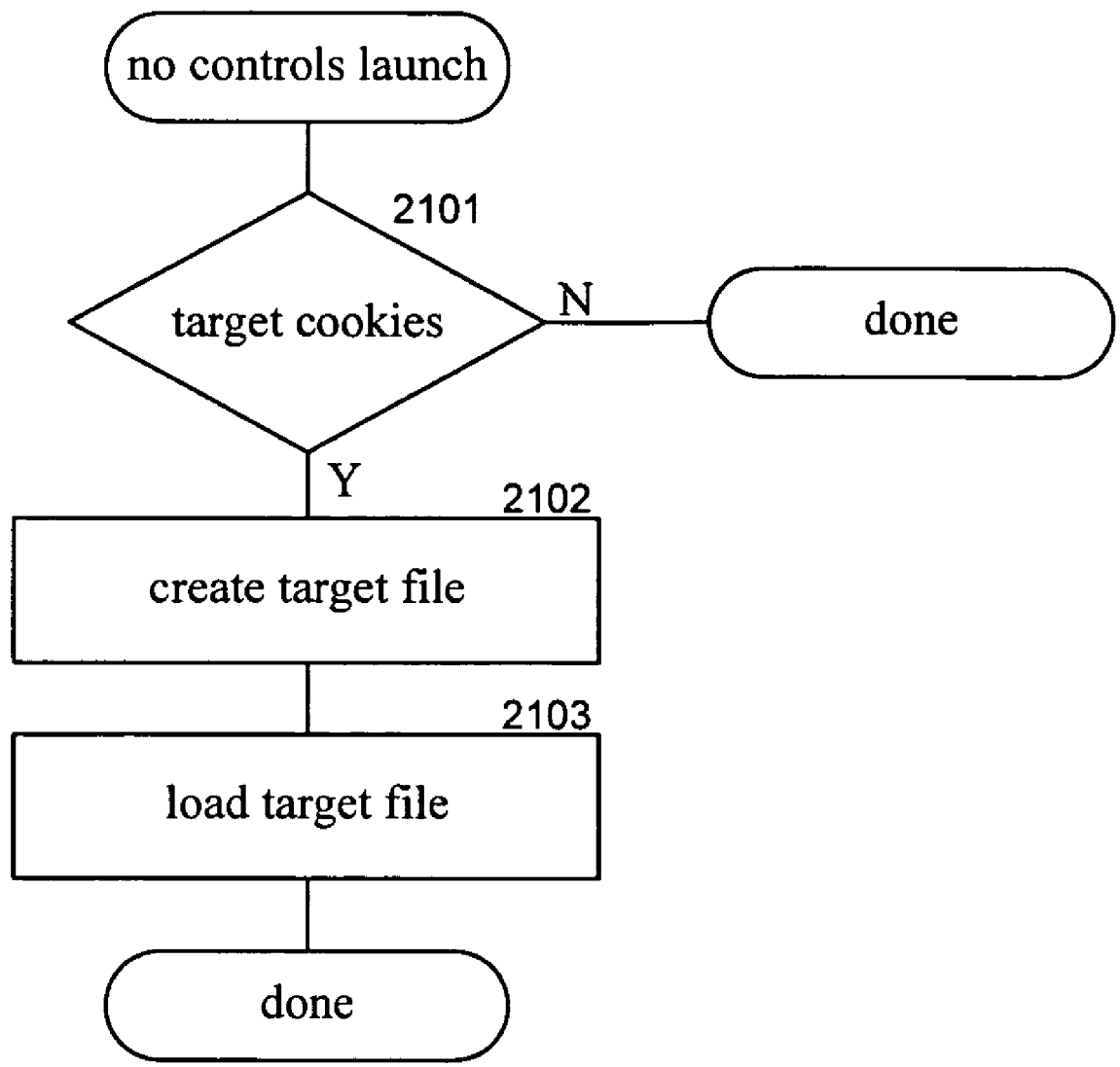

FIGS. 20-21 illustrate the processing of the frames of a no-control-based web page in one embodiment. In block 2001, the frame invokes the no-controls launch component that attempts to launch the target application. If the target application is not launched, then the user will need to select a link of the web page. In block 2002, the frame waits until the user selects the install link of the web page. In block 2003, the frame invokes the download/installation component to download and install the target application. Upon completion of the downloaded installation, the user will need to select a launch link of the web page. In block 2004, the frame waits for the user to select the launch link of the web page. In block 2005, the frame invokes the no-controls launch component and then completes.

FIG. 21 is a flow diagram that illustrates the processing of the no-controls launch component in one embodiment. The component creates a target file with a certain MIME-type file extension that has been associated with the target application. The component then loads the file, which causes the target application to be launched because of the MIME-type association. In decision block 2101, if the target cookies or the registered MIME-type is found, then the component continues at block 2102, else the component completes. In block 2102, the component creates the target file which may contain authentication information for use by the target application. In block 2103, the component loads the target file to effect the launching of the target application. The component then completes.

From the foregoing, it will be appreciated that specific embodiments of the installation system have been described herein for purposes of illustration, but that various modifications may be made without deviating from the spirit and scope of the invention. Accordingly, the invention is not limited except as by the appended claims.

We claim:

1. A method in a computer system for downloading a target application, the method comprising:
 receiving a display page having a first frame, a second frame, and a third frame;
 under control of the first frame that is being periodically loaded by the display page, determining whether the target application is installed at the computer system;
 upon determining that the target application is installed, notifying the second frame that the target application is installed; and
 upon determining that the target application is not installed, notifying the third frame that
 the target application is to be downloaded and installed;
 under control of the second frame,
 polling for an indication that the target application has been installed; and upon receiving the indication the target application has been installed, effecting execution of the target application: and under control of a third frame,
 upon receiving notification from the first frame that the target application is to be downloaded and installed, starting execution of a download and install application to download the target application to the computer system and to install the target application at the computer system wherein after the first frame is next loaded, the first frame notifies the second frame that the target application is installed so that the second frame can effect execution of the target application;
 wherein initiating the downloading and installing of another version of the target application upon determining that the target application is installed and yet the other version of the target application is available;
 wherein the display page includes a fourth frame that determines whether another version of the target application is available.

2. The method of claim 1 wherein the indication that the target application has been installed is successful loading of a target control associated with the target application.

3. The method of claim 1 wherein the indication that the target application has been installed is storing of a cookie associated with the target application.

4. The method of claim 3 wherein cookies are stored for multiple domains including a domain from which the display page was retrieved.

5. The method of claim 1 wherein the display page includes a fourth frame and the effecting execution of the target application includes signaling the fourth frame to launch the target application.

6. The method of claim 1 including using storing of a cookie as a result of downloading and installing the other version of the target application as an indication that the other version of the target application has been downloaded and installed.

7. The method of claim 1 wherein the indication that the target application has been installed is registration of a MIME-type file extension associated with the target application.

8. A computer-readable storage medium encoded with instructions for controlling a computer system to download a client-side component of a web-based service to the computer system, by a method comprising:
 under control of a test frame of a web page provided by the web-based service, the test frame being periodically loaded by the web page, determining whether the client-side component can be loaded for execution on the computer system; upon determining that the client-side component cannot be loaded, notifying a setup frame of the web page that the client-side component cannot be loaded; and
 upon determining that the client-side component can be loaded, notifying an execution frame of the web page that the client-side component can be loaded; under control of the setup frame of the web page, waiting for notification that the client-side component cannot be loaded; and
 upon receiving notification that the client-side component cannot be loaded, launching a download and install application to download the client-side component from a server to the computer system and to install the downloaded client-side component at the computer system wherein after the test frame is next loaded, it can notify the execution frame that the client-side component can be loaded; and
 under control of the execution frame of the web page, waiting for notification that the client-side component can be loaded; and upon receiving notification that the client-side component can be loaded, launching the client-side component;
 wherein initiating the downloading and installing of another version of the target application upon determining that the target application is installed and yet the other version of the target application is available;
 wherein the display page includes a fourth frame that determines whether another version of the target application is available.

9. The computer-readable medium of claim 8 including under control of the execution frame of the web page, upon receiving notification that the client-side component can be loaded and before launching the client-side component, determining whether a version of the client-side component that is installed is current;

upon determining that the version of the client-side component that is installed is not current, overwriting the test frame of the web page with a test frame that implements a cookie-based technique for determining whether the client-side component has been installed; and launching the download and install application to download the client-side component from the server to the computer system and to install the downloaded client-side component at the computer system wherein a cookie is stored indicating that the client-side component has been installed; and if it is determined that the version of the client side component that is installed is current, launching the client-side component.

10. The computer-readable medium of claim 9 including under control of the overwritten test frame, checking whether a cookie has been stored indicating that the client-side component has been installed; and if the checking indicates that the cookie has been stored, notifying the execution frame of the web page that the newly installed version of the client-side component can be loaded.

11. The computer-readable medium of claim 9 wherein cookies are stored for multiple domains including the domain from which the web page was retrieved so that test frame can access the cookie regardless from which of the multiple domains the web page was retrieved.

* * * * *

UNITED STATES PATENT AND TRADEMARK OFFICE
CERTIFICATE OF CORRECTION

PATENT NO.        : 7,596,610 B2                                    Page 1 of 1
APPLICATION NO. : 11/081806
DATED             : September 29, 2009
INVENTOR(S)       : Faisal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this

Twenty-eighth Day of September, 2010

David J. Kappos
*Director of the United States Patent and Trademark Office*